United States Patent
Kaneko

(10) Patent No.: US 11,274,923 B2
(45) Date of Patent: Mar. 15, 2022

(54) POWER SUPPLY UNIT MOUNTING STRUCTURE AND SURVEYING INSTRUMENT

(71) Applicant: TOPCON Corporation, Tokyo (JP)

(72) Inventor: Shinsuke Kaneko, Tokyo (JP)

(73) Assignee: TOPCON Corporation, Tokyo (JP)

( * ) Notice: Subject to any disclaimer, the term of this patent is extended or adjusted under 35 U.S.C. 154(b) by 103 days.

(21) Appl. No.: 16/819,609

(22) Filed: Mar. 16, 2020

(65) Prior Publication Data
US 2020/0309522 A1    Oct. 1, 2020

(30) Foreign Application Priority Data

Mar. 27, 2019   (JP) .............................. JP2019-059777

(51) Int. Cl.
*G01C 15/00*   (2006.01)
*H01M 50/209*  (2021.01)

(52) U.S. Cl.
CPC .......... *G01C 15/00* (2013.01); *H01M 50/209* (2021.01); *H01M 2220/30* (2013.01)

(58) Field of Classification Search
CPC  G01C 15/00; H01M 50/209; H01M 2220/30; G01D 11/24; G01D 11/245; G01D 11/26; G01D 11/30
See application file for complete search history.

(56) References Cited

U.S. PATENT DOCUMENTS

| | | | |
|---|---|---|---|
| 5,280,273 A | 1/1994 | Goldstein | |
| 5,626,979 A | 5/1997 | Mitsui et al. | |
| 6,530,804 B1 | 3/2003 | Wu | |
| 2018/0293725 A1* | 10/2018 | Ohshima | ................ G01N 21/88 |

(Continued)

FOREIGN PATENT DOCUMENTS

| | | |
|---|---|---|
| EP | 2082848 A1 | 7/2009 |
| EP | 2605308 A1 | 6/2013 |
| JP | 62-2452 A | 1/1987 |

(Continued)

OTHER PUBLICATIONS

European communication dated Jul. 27, 2020 in corresponding European patent application No. 20165584.2.

(Continued)

*Primary Examiner* — Natalie Huls
*Assistant Examiner* — Cynthia L. Davis
(74) *Attorney, Agent, or Firm* — Nields, Lemack & Frame, LLC

(57) ABSTRACT

A power supply unit mounting structure comprises two stepped lock pins provided at an opening of a power supply unit storage and a seal provided at the opening, wherein the power supply unit comprises a flange part and a lock module provided on the flange part, wherein the lock module comprises a lock knob which is rotatable, a lock plate provided at a tip of a rotation shaft of the lock knob, and a cam mechanism configured to displace the lock plate in an axial direction, wherein the power supply unit is inserted into the power supply unit storage, by rotating the lock knob, the lock plate is rotated, a rotation of the lock plate is restrained, by rotating the lock knob after restraining the rotation of the lock plate, the flange part is displaced to the opening side, the seal is pressed, and the opening is sealed.

1 Claim, 4 Drawing Sheets

(56) References Cited

U.S. PATENT DOCUMENTS

2019/0025883 A1   1/2019  Alsheuski
2020/0313124 A1   10/2020  Kaneko

FOREIGN PATENT DOCUMENTS

JP        3428182 B2    7/2003
JP     2006-216462 A    8/2006
JP     2008-257944 A    10/2008

OTHER PUBLICATIONS

European communication dated Jul. 28, 2020 in co-pending European patent application No. 20165587.5.
Office action dated Sep. 13, 2021 in co-pending U.S. Appl. No. 16/819,611.
Notice of allowance dated Dec. 20, 2021 in co-pending U.S. Appl. No. 16/819,611.

* cited by examiner

POWER SUPPLY UNIT MOUNTING STRUCTURE AND SURVEYING INSTRUMENT

BACKGROUND OF THE INVENTION

The present invention relates to a power supply unit mounting structure which enables a power supply unit to be easily attached and detached and to a surveying instrument.

Since a surveying instrument is used in a location or an environment where a commercial power supply is unavailable such as in the field and the like, the instrument itself is provided with a power supply. Further, a rechargeable battery is usually used as a power supply, and the battery is replaceable with respect to the surveying instrument.

Further, since the surveying instrument is used in the field, a waterproof property is required, and the battery is desired to be easily replaceable.

SUMMARY OF THE INVENTION

It is an object of the present invention to provide a power supply unit mounting structure which facilitates a replacement of a battery and has a waterproof structure, and a surveying instrument.

To attain the object as described above, a power supply unit mounting structure according to the present invention for mounting a power supply unit which is inserted into a power supply unit storage of a surveying instrument main body comprises two stepped lock pins protruded adjacent to an opening of the power supply unit storage and a seal provided in such a manner that the seal surrounds the opening, wherein the power supply unit comprises a flange part and a lock module provided on the flange part, wherein the lock module comprises a lock knob which is rotatable and of which axis displacement is restrained, a lock plate provided at a tip of a rotation shaft of the lock knob, and a cam mechanism configured to displace the lock plate in an axial direction by restraining a rotation of the lock plate, wherein, at both end portions, the lock plate includes engagement holes which are engageable with the lock pins, and wherein the lock pins are inserted into the engagement holes by inserting the power supply unit into the power supply unit storage, by rotating the lock knob, the lock plate is rotated and the lock pins engage with the engagement holes, the rotation of the lock plate is restrained by the engagement holes, by rotating the lock knob after restraining the rotation of the lock plate, the flange part is displaced to the opening side, the seal is pressed and the opening is sealed.

Further, in the power supply unit mounting structure according to a preferred embodiment, the cam mechanism comprises a cam plate which is rotatably and slidably provided to the rotation shaft, a V-groove formed on the cam plate, a cam pin provided at a tip portion of the rotation shaft in such a manner that the cam pin is orthogonal to a rotation axis and which is fittable and removable with respect to the V-groove, and an energizing means which energizes the cam plate in such a manner that the cam plate is pressed against the cam pin, and wherein the lock plate is fixed to the cam plate.

Furthermore, a surveying instrument according to the present invention comprises a surveying instrument main body which has a power supply unit storage, a power supply unit which is inserted into the power supply unit storage, and the power supply unit mounting structure.

According to the present invention, the power supply unit mounting structure for mounting a power supply unit which is inserted into a power supply unit storage of a surveying instrument main body comprises two stepped lock pins protruded adjacent to an opening of the power supply unit storage and a seal provided in such a manner that the seal surrounds the opening, wherein the power supply unit comprises a flange part and a lock module provided on the flange part, wherein the lock module comprises a lock knob which is rotatable and of which axis displacement is restrained, a lock plate provided at a tip of a rotation shaft of the lock knob, and a cam mechanism configured to displace the lock plate in an axial direction by restraining a rotation of the lock plate, wherein, at both end portions, the lock plate includes engagement holes which are engageable with the lock pins, and wherein the lock pins are inserted into the engagement holes by inserting the power supply unit into the power supply unit storage, by rotating the lock knob, the lock plate is rotated and the lock pins engage with the engagement holes, the rotation of the lock plate is restrained by the engagement holes, by rotating the lock knob after restraining the rotation of the lock plate, the flange part is displaced to the opening side, the seal is pressed and the opening is sealed. As a result, an attachment and detachment of the power supply unit with respect to the power supply unit storage is completed only by rotating the lock knob, and the replacement of the battery is easy.

DETAILED DESCRIPTION OF THE PREFERRED EMBODIMENT

A description will be given below on an embodiment of the present invention by referring to the attached drawings.

Figure 1:
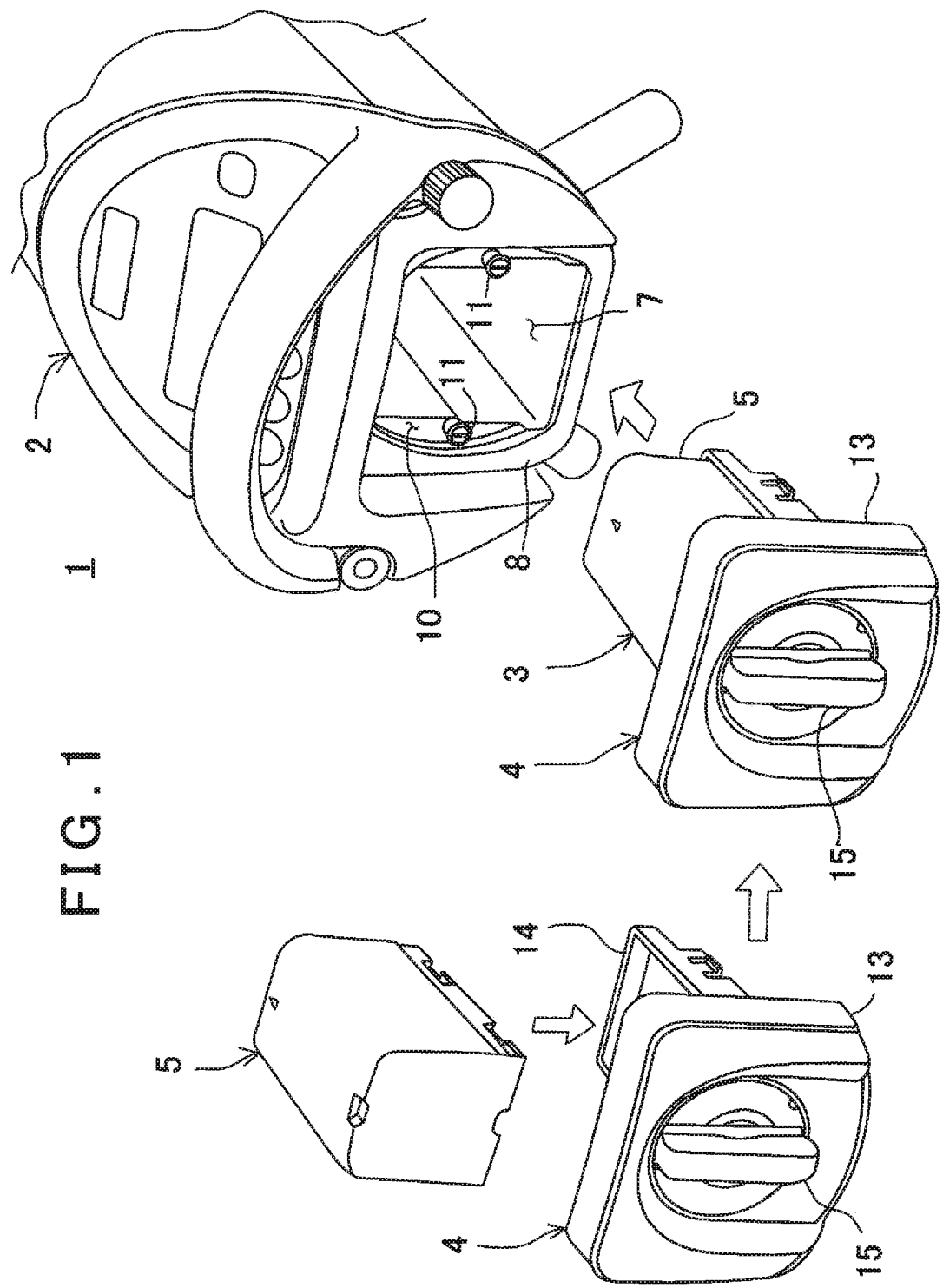
FIG. 1 is an overall perspective view of an embodiment according to the present invention.
Figure 2A:
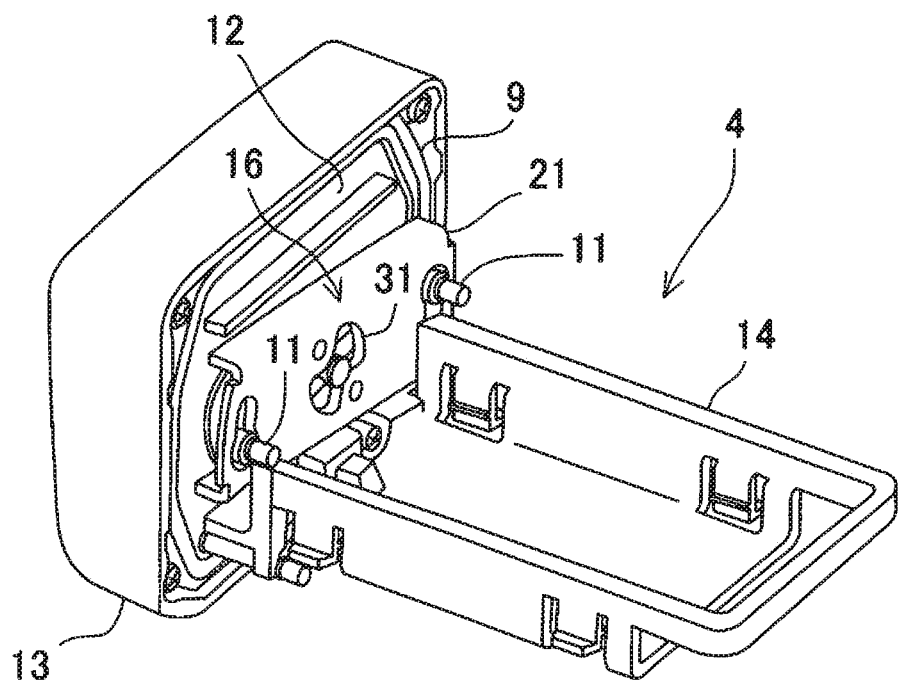
FIG. 2A is a perspective view of an opened state of a battery holder in the embodiment.
Figure 2B:
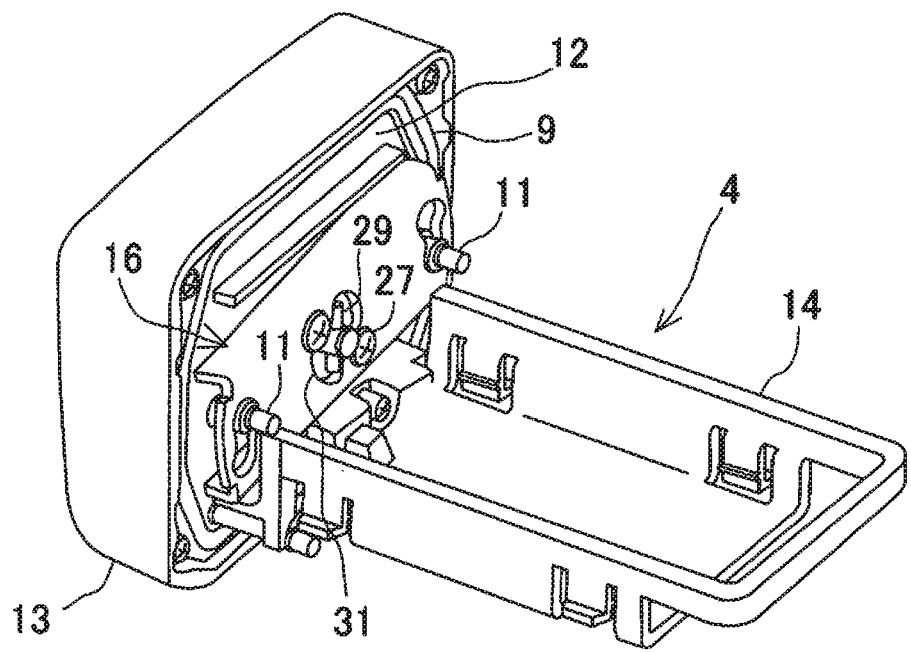
FIG. 2B is a perspective view of a locked state of the battery holder.

FIG. 1 is a perspective view of a surveying instrument 1 according to the present embodiment as viewed from the rear, and FIG. 2A and FIG. 2B are perspective views of a battery holder 4 as viewed from the front.

In FIG. 1, a reference numeral 2 denotes a surveying instrument main body, a reference numeral 3 denotes a power supply unit, a reference numeral 4 denotes the battery holder, and a reference numeral 5 denotes a battery.

The surveying instrument 1 mainly has the surveying instrument main body 2 and the power supply unit 3.

The surveying instrument main body 2 has a power supply unit, storage 7 which is opened to the rear. The power supply unit 3 is inserted into the power supply unit storage 7 from a horizontal direction.

An abutting surface 8 receding inward from a rear end surface of the surveying instrument main body 2 is formed around an opening of the power supply unit storage 7.

Lock pins 11 are protruded at two positions (left-and-right two positions in the drawing) interposing the opening therebetween on a flange surface 10 receding inward from the abutting surface 8.

The power supply unit 3 is made up by the battery holder 4 and the battery 5, and the battery 5 is mounted on the battery holder 4 from above.

The battery holder 4 consists of a flange part 13 and a battery case 14 which extends frontward. A shallow bottom concave portion is formed to the battery case 14, and the battery 5 is fitted in the concave portion from above. Electric contacts (not shown) are formed on a front end surface (in the drawing, an end surface on the surveying instrument main body 2 side) of the battery 5.

The flange part 13 abuts on the abutting surface 8 in such a manner that a receding part of the abutting surface 8 is filled. Further, the flange part 13 has a lid 12 which closes the opening of the power supply unit storage 7, and a lock module 16 (to be described later) is provided on the flange part 13. The lock module 16 has a lock knob 15, and the lock knob 15 is rotatably held in the flange part 13 without a displacement in an axial direction. The lid 12 is provided with a seal 9, and the seal 9 can abut on a rim of the opening. It is to be noted that the seal 9 may be provided on the abutting surface 8 side.

By inserting the power supply unit 3 into the power supply unit storage 7, the lid 12 closes the opening, and the seal 9 abuts on the rim of the opening. In a state where the power supply unit 3 is completely inserted (mounted), the electric contacts of the battery 5 are joined with electric contacts on the surveying instrument main body 2 side. In a state where the power supply unit 3 is mounted, when the lock knob 15 is rotated, the lock module 16 engages with the lock pins 11. Thereby, the power supply unit 3 is fastened to the surveying instrument main body 2, the seal 9 closely adheres to the rim of the opening, and the opening is liquid-tightly sealed.

A description will be given on the lock module 16 by referring to FIG. 2A, FIG. 2B, FIG. 3, FIG. 4A, and FIG. 4B.

FIG. 2A and FIG. 2B are perspective views of the battery holder 4 as viewed from the front, where FIG. 2A shows an opened state and FIG. 2B shows a locked state. In FIG. 2A and FIG. 2B, the right side is determined to be the front, and the left side is determined to be the rear. It is to be noted that the battery 5 is omitted in the drawings.

Further, in FIG. 2A and FIG. 2B, reference numerals 11 denote lock pins, and as shown in FIG. 1, the lock pins 11 are protruded on the abutting surface 8 of the surveying instrument main body 2.

The lock module 16 has a lock plate 21 at a front surface position. The lock plate 21 is accommodated in a space between the abutting surface 8 and the flange surface 10, and the lock plate 21 is rotatable in the space. Engagement holes 22 in which the lock pins 11 can be fitted are formed at both end portions of the lock plate 21.

After the lock pins 11 are fitted in the lock plate 21, when the lock plate 21 is rotated at a predetermined angle, the lock plate 21 engages with the lock pins 11. Thereby, a displacement in the axial direction between the lock plate 21 and the lock pins 11 is restrained, and the rotation is restricted by the lock pins 11.

Each of the engagement holes 22 has a keyhole shape in which a circular hole 22a is continuous with a long hole 22b. A diameter of the circular hole 22a is larger than a diameter (a width size) of the long hole 22b.

Each of the lock pins 11 has a stepped shape and is formed of a head portion 11a, a shaft portion 11b, and a screw portion 11c. A diameter of the head portion 11a is smaller than the diameter of the circular hole 22a and larger than the diameter of the long hole 22b. Further, a diameter of the shaft portion 11b is smaller than the diameter of the long hole 22b. Further, an axial length of the shaft portion 11b is slightly longer than a thickness of the lock plate 21. The screw portion 11c is available for fixing the lock pin 11 to the flange surface 10.

In the opened state as shown in FIG. 2A and also in a state where the battery holder 4 is inserted into the power supply unit storage 7, the axis of each lock pin 11 coincides with the center of each circular hole 22a. Further, in a state where the battery holder 4 is completely inserted into the power supply unit storage 7, each head portion 11a passes through each circular hole 22a, and each shaft portion 11b is loosely fitted in each circular hole 22a.

When the lock knob 15 is turned in this state, the lock plate 21 rotates, and the shaft portions 11b are fitted in the long holes 22b respectively. In a state where the shaft portions 11b are fitted in the long holes 22b respectively, since the diameter of each head portion 11a is larger than the diameter of each long hole 22b, the movement of the lock plate 21 in a front-and-rear direction is restrained by the lock pins 11. That is, the battery holder 4 is fastened with respect to the surveying instrument main body 2 via the lock plate 21 and the lock pins 11.

Figure 3:
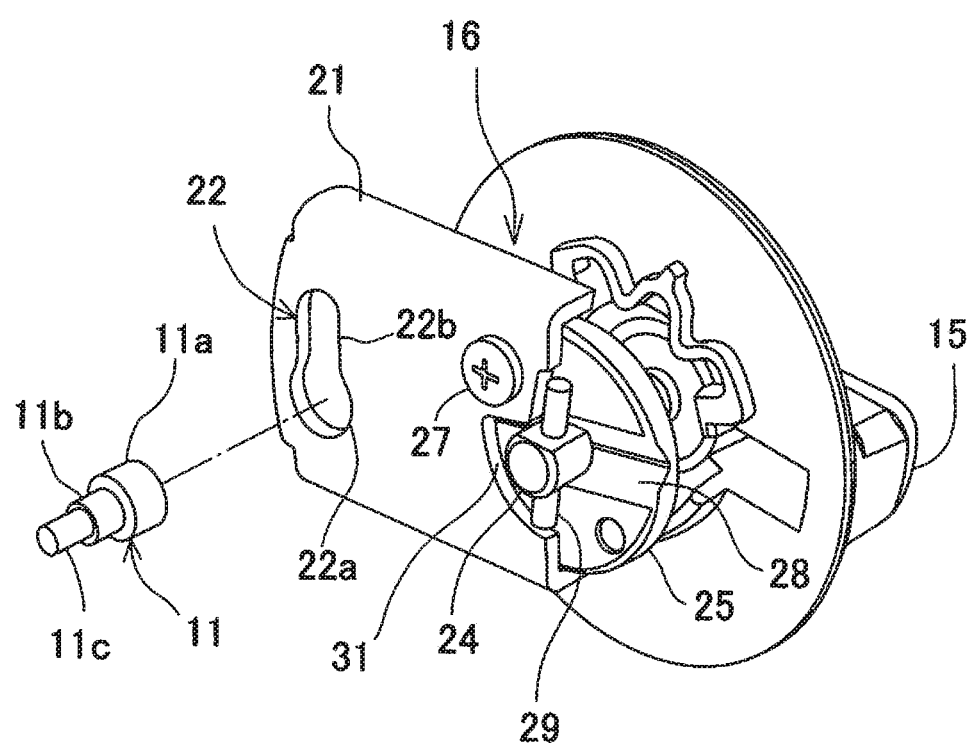
FIG. 3 is a perspective view of a lock module.
Figure 4A:
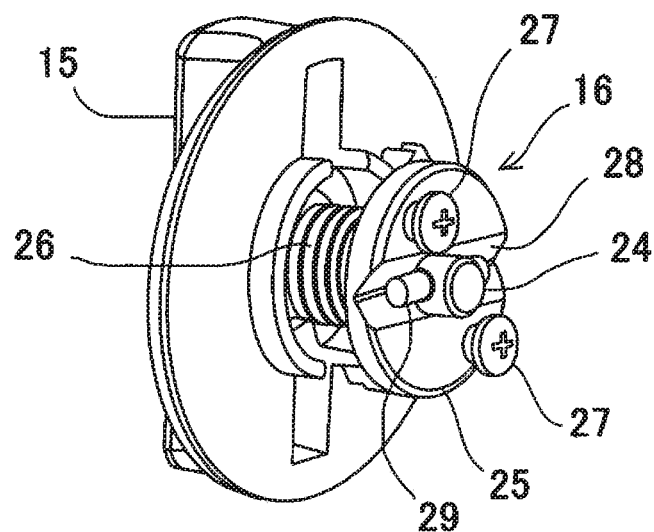
FIG. 4A is a perspective view of an opened state of the lock module in which a lock plate is omitted.
Figure 4B:
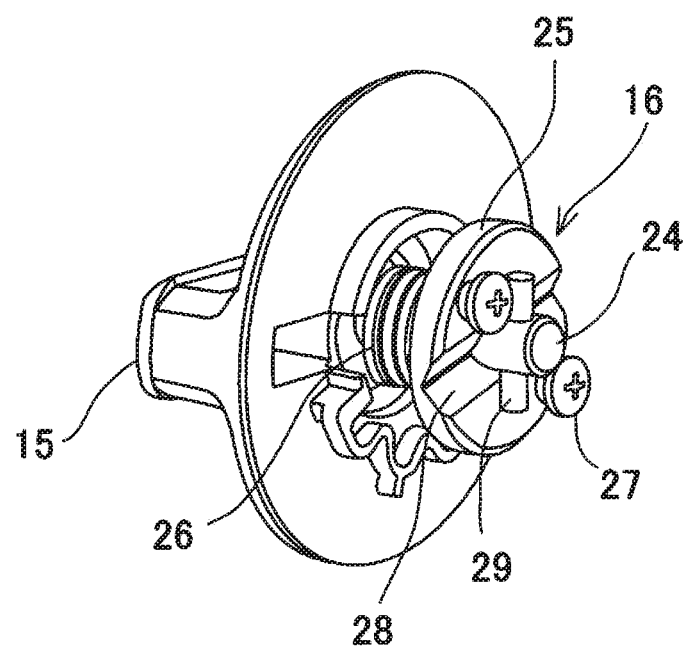
FIG. 4B is a perspective view of a locked state of the lock module in which the lock plate is omitted.

A description will be further given on the lock module 16 by referring to FIG. 3, FIG. 4A, and FIG. 4B. It is to be noted that, in FIG. 3, to facilitate the understanding, a half of the lock plate 21 is shown.

A discoid cam plate 25 is rotatably and slidably fitted on a rotation shaft 24 of the lock knob 15. The lock plate 21 is fixed to the cam plate 25 by bolts 27. A compression spring 26 as an energizing means is provided in a compressed state on a rear surface side (a rear side) of the cam plate 25, and the compression spring 26 energizes the cam plate 25 toward a tip side (the right side in FIG. 4A and FIG. 4B) of the rotation shaft 24. That is, the compression spring 26 energizes the cam plate 25 in such a manner that the cam plate 25 is pressed against the lock pins 11. It is to be noted that the energizing means may be a coned disc spring, an elastic rubber, a waved washer, or the like.

A V-groove 28 is formed on the cam plate 25. A center line of the V-groove 28 runs through the axis of the rotation shaft 24 and is also orthogonal to the axis.

The rotation shaft 24 passes through the cam plate 25, and a cam pin 29 which is orthogonal to the axis of the rotation shaft 24 is provided at a protruding tip portion of the rotation shaft 24. It is to be noted that an axial length of the cam pin 29 is sufficiently shorter that a length (a diameter) of the lock knob 15.

An escape hole 31 is formed at a central portion of the lock plate 21 in such a manner that an interference with the rotation shaft 24 and the cam pin 29 is avoided. The escape hole 31 has a shape which allows a relative rotation at a predetermined angle among the lock plate 21, the rotation shaft 24, and the cam pin 29. For example, the escape hole 31 has a shape in which a fan shape is point-symmetrically arranged with respect to the center of the rotation shaft 24, and a center angle of the fan shape has the predetermined angle of the relative rotation.

FIG. 4A shows an unlocked state of the lock module 16, and the cam pin 29 is fitted in the V-groove 28 by an energizing force of the compression spring 26. Therefore, in a state where the rotation of the cam plate 25 is not restrained, the cam plate 25 and the rotation shaft 24, that is, the lock knob 15, integrally rotate.

Next, when the rotation of the cam plate 25 is restrained and further the rotation shaft 24 is rotated in a restrained state, the rotation shaft 24 is relatively rotated with respect to the cam plate 25. Thereby, the cam pin 29 gets over a slant surface of the V-groove 28 and runs up onto a flat surface of the cam plate 25 (FIG. 4B).

When the cam 29 gets out of the V-groove 28 and runs up onto the flat surface of the cam plate 25, the cam plate 25 is displaced to the lock knob 15 side against the energizing force of the compression spring 26. Actually, the cam plate 25 is fixed to the lock plate 21, the lock plate 21 is restrained by the lock pins 11, and hence the cam plate 25, that is, the lock knob 15 is displaced to the surveying instrument main body 2 side. Since the displacement of the lock knob 15 is a displacement of the flange part 13, the seal 9 is compressed, and the sealing is performed.

The cam plate 25 rotatably and axially displaceably fitted on the rotation shaft 24, the V-groove 28 formed on the cam plate 25, the cam pin 29 capable of fitting in the V-groove 28, the compression spring 26, and the like make up a cam mechanism. The cam mechanism enables the cam pin 29 to get out of the V-groove 28 by restraining the rotation of the cam plate 25 and enables the cam plate 25 to displace in the axial direction of the rotation shaft 24.

It is to be noted that, forces of when the cam pin 29 gets out of the V-groove 28 and of when the seal 9 is compressed, become loads at the time of rotating the lock knob 15. However, the axial length of the cam pin 29 is short, a rotational resistance is limited to the vicinity of the rotation center, and hence a load torque to be produced is small.

A description will be given on a flow of mounting the battery 5 to the surveying instrument main body 2 by referring to FIG. 1.

First, the battery 5 is loaded onto the battery case 14 from above in such a manner that the power supply unit 3 is provided. The power supply unit 3 is inserted into the power supply unit storage 7 from the horizontal direction.

The lock pins 11 are fitted in and pass through the circular holes 22a. When the lock knob 15 is rotated, the cam plate 25 and the lock plate 21 rotate integrally with the lock knob 15, the long holes 22b are fitted in the shaft portions 11b, and then the shaft portions 11b abut against end edges of the long holes 22b respectively, and the rotation of the lock plate 21 is restrained. At the same time, the rotation of the cam plate 25 is also restrained.

When the lock knob 15 is further rotated in the same direction, since the rotation shaft 24 relatively rotates with respect to the cam plate 25, the cam pin 29 gets out of the V-groove 28 and runs up onto the flat surface of the cam plate 25.

The lock knob 15 is displaced toward the lock plate 21, that is, the flange part 13 is displaced toward the abutting surface 8. Thereby, the lid 12 closes the opening, the seal 9 is compressed between the lid 12 and the abutting surface 8, and the sealing is performed between the lid 12 and the abutting surface 8.

Therefore, the rotation of the lock knob 15 in one direction completes the locking and the sealing of the power supply unit 3 with respect to the surveying instrument main body 2. It is to be noted that, in case of removing the power supply unit 3, by rotating the lock knob 15 in a reverse direction, it is possible to easily remove the power supply unit 3.

In the present embodiment, the battery 5 can be easily mounted to the battery holder 4 with no obstruction, and only the rotation of the lock knob 15 in one direction suffices to mount the battery holder 4 to the surveying instrument main body 2. As a result, at is possible to easily replace the battery 5 of the surveying instrument 1.

The invention claimed is:

1. A surveying instrument comprising a surveying instrument main body which has a power supply unit storage, a power supply unit which is inserted into said power supply unit storage, and a power supply unit mounting structure for mounting said power supply unit, wherein said power supply unit mounting structure comprises: two stepped lock pins protruded adjacent to an opening of said power supply unit storage and a seal provided in such a manner that said seal surrounds said opening, wherein said power supply unit, comprises a flange part and a lock module provided on said flange part, wherein said lock module comprises a lock knob which is rotatable and of which axis displacement is restrained, a lock plate provided at a tip of a rotation shaft of said lock knob, and a cam mechanism configured to displace said lock plate in an axial direction by restraining a rotation of said lock plate, wherein, at both end portions, said lock plate includes engagement holes which are engageable with said lock pins, and wherein said lock pins are inserted into said engagement holes by inserting said power supply unit into said power supply unit storage, by rotating said lock knob, said lock plate is rotated and said lock pins engage with said engagement holes, the rotation of said lock plate is restrained by said engagement holes, by rotating said lock knob after restraining the rotation of said lock plate, said flange part is displaced to said opening side, said seal is pressed, and said opening is sealed, wherein said cam mechanism comprises a cam plate which is rotatably and slidably provided to said rotation shaft, a V-groove formed on said cam plate, a cam pin provided at a tip portion of said rotation shaft in such a manner that said cam pin is orthogonal to a rotation axis and which is fittable and removable with respect to said V-groove, and an energizing means which energizes said cam plate is such a manner that said cam plate is pressed against said cam pin, and wherein said lock plate is fixed to said cam plate.

\* \* \* \* \*